United States Patent [19]
Bird et al.

[11] Patent Number: 5,900,767
[45] Date of Patent: May 4, 1999

[54] ELECTRONIC DEVICES COMPRISING AN ARRAY

[75] Inventors: Neil C. Bird, Horley; Gerard F. Harkin, London, both of United Kingdom

[73] Assignee: U.S. Philips Corporation, New York, N.Y.

[21] Appl. No.: 08/666,111

[22] Filed: Jun. 19, 1996

[30] Foreign Application Priority Data

Jun. 24, 1995 [GB] United Kingdom ............... 9512942
Dec. 21, 1995 [GB] United Kingdom ............... 9526159

[51] Int. Cl.$^6$ ............................................ H03K 17/74
[52] U.S. Cl. ................... 327/407; 327/494; 327/583; 327/587
[58] Field of Search ............................. 327/407–410, 327/493–497, 503–505, 508, 574, 575, 583, 585, 587

[56] References Cited

U.S. PATENT DOCUMENTS

| | | | |
|---|---|---|---|
| 2,803,703 | 8/1957 | Sherwin | 327/571 |
| 3,098,214 | 7/1963 | Windes et al. | 327/494 |
| 3,389,272 | 6/1968 | Cherry | 327/497 |
| 3,597,633 | 8/1971 | Hirano | 327/497 |
| 3,629,863 | 12/1971 | Neale | 327/583 |
| 3,916,392 | 10/1975 | Richardson | 327/583 |
| 4,518,921 | 5/1985 | Logan | 328/151 |

FOREIGN PATENT DOCUMENTS

| | | | |
|---|---|---|---|
| 0633542A2 | 1/1995 | European Pat. Off. ........ | G06K 11/08 |
| 57-125523 | 8/1982 | Japan | 327/494 |
| 5-191250 | 7/1993 | Japan | 327/407 |

OTHER PUBLICATIONS

Solid–State Switch, by J. C. Elliott. IBM Technical Disclosure Bulletin, vol. 12, No. 10, Mar. 1970.

*Primary Examiner*—Timothy P. Callahan
*Assistant Examiner*—T. T. Lam
*Attorney, Agent, or Firm*—Daniel E. Tierney

[57] ABSTRACT

A large-area electronic device comprises an array (1) of device elements (2,3) coupled to row and column conductors (A and B). The column conductors (B) are arranged in groups, (e.g M, M+1, M+2), and a column multiplexer circuit (C) couples the column conductors (B) of a respective group to a respective common terminal (5). The present invention provides a compatible multiplexer circuit (C) for the array (1), the operation of the circuit (C) using electrical switching rather than optical switching. This multiplexer circuit (C) for each column conductor comprises a diode bridge (SD3 to SD6) and may include a clamping switch (SD1, SD2). A signal is transmitted between the column conductor (B) and a common output terminal (5) in a first state of the diode bridge (SD3 to SD6). The potential of the column conductor (B) is clamped by the clamping switch (SD1, SD2) in a second state of the diode bridge. Each arm (11,12) of the bridge comprises a respective pair of diodes (SD3, SD4), (SD5, SD6) having the same polarity as each other between two current sources (21,22). The respective column conductor (B) is coupled to the diode node (13) of the first arm (11). The common terminal (5) is coupled to the diode node (14) of the second arm (12). Control lines (16,17) apply switching voltages (Vx, Vy) for switching the clamping switch (SD1, SD2) and bridge (SD3 to SD6). Such multiplexer circuits (C) in accordance with the present invention can readily be constructed with the same technology type(s) of circuit elements (e.g. thin-film diodes or diode-connected thin-film transistors) for the bridge and clamping switch as used for the device elements of the array (1). The invention also provides a control method which reduces the peak current flowing in the diode bridge.

11 Claims, 6 Drawing Sheets

ELECTRONIC DEVICES COMPRISING AN ARRAY

BACKGROUND OF THE INVENTION

This invention relates to electronic devices, particularly but not exclusively with thin-film circuitry, comprising an array of device elements and having column multiplexer circuits. The device elements produce currents flowing in the columns of the arrays, and may be image sensor elements, for example photosensitive diodes, of a large area image sensor, or other types of device element, for example temperature sensing elements of a thermal imaging device.

Published European Patent Application EP-A-0 633 542 (Our reference PHB 33858) discloses such an electronic device comprising an array of device elements which are arranged in rows and columns and which are coupled to row and column conductors. The column conductors are arranged in groups, each group having a respective common terminal. A column multiplexer circuit couples the column conductors of a respective group to the respective common terminal. FIG. 3 of EP-A-0 633 542 illustrates a particularly advantageous form of such a device. The device is an image sensor array, the device elements of which comprise photosensitive diodes 8a and switching diodes 8b. The column conductors 10 transmit analogue signals from the photosensitive diodes 8a to a charge-sensitive amplifier 20 via the column multiplexer circuits. The column multiplexer circuits comprise photosensitive diodes 11b and 11c which are switched from a blocking state to a conductive state by illumination from a corresponding arrangement of light sources. Thus, the invention described and claimed in EP-A-0 633 542 permits the column multiplexer circuits to be fabricated with diodes and using the same technology type as the device elements of the array. FIG. 3 shows a group of three such column conductors 10 coupled by these column multiplexer circuits to one charge-sensitive amplifier 21. However, the column multiplexer circuits of EP-A-0 633 542 require alignment of the light sources with the photosensitive diodes of the multiplexer circuits. Depending on the type of light source used, the switching of the light source may also introduce an undesirable delay in the switching of the multiplexer circuits.

U.S. Pat. No. 4,518,921 discloses a sample and hold circuit comprising a diode bridge having first and second arms between first two current sources, each arm comprising a respective pair of diodes coupled together at a respective node of that arm and having the same polarity as each other between the current sources. The input of the sample and hold circuit is coupled to the node of the first arm, and the output is coupled to the node of the second arm. Control lines apply switching voltages for switching the two current sources on in a first state of the bridge and off in a second state of the bridge, a signal being sampled in the first state of the diode bridge. In the first, ON, state of the diode bridge, the current sources supply current through the diodes of the diode bridge, and the current sources are supplied with appropriate voltages to enable this.

The use of current sources to supply and drain the diode bridge of U.S. Pat. No. 4,518,921 enables the voltage levels of the diode bridge to float so that the output voltage may follow the input voltage. The sample and hold circuit further comprises second two current sources connected in parallel with the first two current sources, which provide a current through a third arm having a pair of diodes of opposite polarity to the diodes of the diode bridge. In this way, when the bridge is OFF, the second two current sources are turned on and a current flows through the third arm. The third arm serves to maintain the voltage across the bridge constant during the OFF interval, but without fixing the input voltage level. This is achieved by driving a constant current through fixed resistors. During the ON interval, the output voltage is free to follow the input voltage because the output is coupled to a capacitive load which charges or discharges as the output voltage follows the input voltage.

The invention seeks to provide a array of device elements having a column multiplexer circuit, the operation of the circuit using electrical switching rather than optical switching. The invention resides in the use of current-source fed diode bridge circuits as the switching elements of a multiplexing circuit for interfacing a number of column terminals of an array of electrical elements to a single terminal. This produces an electrical device according to which each of a number of column terminals has a sampling circuit, only one of which is turned on (in the first state of the bridge) so as to carry out a multiplexing operation.

A problem which arises in image sensors is interference between pixels in a column (vertical cross talk). This arises because currents are produced by illuminated pixels, and for a selected row these currents are free to flow into the associated column. When the associated column switch is turned off there is no path along which these currents may dissipate, and they accordingly create voltage biases on the pixels of other rows in the column.

Therefore, a more specific aim of the invention, in its first aspect, is to reduce vertical cross talk in such an array, by dissipating these currents. The sample and hold circuit of U.S. Pat. No. 4,518,921 could not achieve this, since in the OFF condition a fixed current is driven through the third arm, so no additional current may be accommodated. The diodes of the diode bridge are reverse biased and therefore also do not conduct any current.

OBJECTS AND SUMMARY OF THE INVENTION

According to a first aspect of the present invention, there is provided:

an electronic device comprising an array of device elements which are arranged in rows and columns and which are coupled to row and column conductors, the column conductors being arranged in at least one group, each group having a respective common terminal, and a column multiplexer circuit coupling the column conductors of a respective group to the respective common terminal, the column multiplexer circuit for each column conductor comprising a respective diode bridge having first and second arms between two current sources, each arm comprising a respective pair of diodes coupled together at a respective node of that arm and having the same polarity as each other between the current sources, the respective column conductor being coupled to the node of the first arm, the common terminal being coupled to the node of the second arm, and control lines coupled to the diode bridge for applying switching voltages for switching the diodes between forward bias in a first state of the bridge and reverse bias in a second state of the bridge, and a clamping switch coupled to the respective column conductor for clamping the potential of the column conductor in the second state of the diode bridge, whereby a signal is transmitted between the column conductor and the common terminal in the first state of the diode bridge whereas the potential of the column conductor is clamped in the second state of the diode bridge.

Since the potential of the column conductor is clamped, in the second state of the bridge, the voltage of the input is held constant when the switch is turned off. In addition, any current produced in the respective column and which is allowed to flow to the column conductor, may be transferred to the voltage source of the clamping switch. This voltage source therefore provides a sink for current flowing in the column conductor. In the case of an image sensor, a current produced by the pixel in a selected row which is in a column having the switch turned off (second state of the switch) will flow to the voltage lines instead of causing a bias on the other pixels of the column.

Another consideration which is important for devices which produce current signals, namely charge storage elements such as image sensor pixels, is that the current which must be supplied to the diode bridge by the current sources must be greater than the maximum current to be switched (i.e. the maximum current flowing to the column terminal). If, for example, the current source is to be implemented by an illuminated photodiode, an undesirably large photodiode area may result if the necessary current is to be supplied to the diode bridge.

A more specific aim of the invention, in its second aspect, is to provide a multiplexer circuit of the type described above for use with an array of charge storage elements which reduces the maximum current flowing to a column terminal, since a current of at least this value must be provided by the current sources of the diode bridge sampling circuit.

According to the second aspect of the present invention there is provided an electronic device comprising:

an array of charge storage elements which are arranged in rows and columns and which are coupled to row and column conductors, a row signal applied to a row conductor enabling charge storage element signals of elements in the respective row to be supplied to the respective column conductors, the charge storage element signals producing a current flowing in the respective column conductors, the column conductors being arranged in at least one group, each group having a respective common terminal;

a column multiplexer circuit coupling the column conductors of a respective group to the respective common terminal, in which the column multiplexer circuit for each column conductor comprises a respective diode bridge having first and second arms between two current sources, each arm comprising a respective pair of diodes coupled together at a respective node of that arm and having the same polarity as each other between the current sources, the respective column conductor being coupled to the node of the first arm, the common terminal being coupled to the node of the second arm;

control lines coupled to the diode bridge for applying switching voltages for switching the diodes between forward bias in a first state of the bridge and reverse bias in a second state of the bridge, whereby a signal is transmitted between the column conductor and the common terminal in the first state of the diode bridge; and means for generating a row signal in the form of a base voltage which is interrupted by a pulse voltage waveform which rises in magnitude, relatively to the base voltage, from a first voltage magnitude immediately following the beginning of the pulse to a second voltage magnitude immediately preceding the end of the pulse.

The rise in the voltage magnitude of the row signal may be uniform, and the signal may include a step which rises in magnitude at the beginning of the pulse, and a step which falls in magnitude at the end of the pulse.

Multiplexer circuits in accordance with the present invention can readily be constructed with the same technology type(s) of circuit elements (e.g. diodes) for the bridge and clamping switch (for the first aspect of the invention) as are used for the device elements of the array. These multiplexer circuits in accordance with the present invention can have a fast switching speed determined by low values of the diode capacitances and by the values of parasitic capacitances in the device. Delays associated with optical switching can be avoided. The circuits are well-suited for integration with arrays, particularly (but not exclusively) when the arrays are themselves based on diodes of the same technology type. Thus, such multiplexer circuits can be designed for use with the column conductors of an image sensor array. The common terminal may be an external terminal of the device, or it may be a connection between parts of the internal circuitry of the device.

Because each column conductor forms part of an array with device elements in more than one row, the clamping switch of the first aspect of the invention may play an important role in stabilising the operation of each device element of that column when its diode bridge is in the second state (i.e. when the diode bridge is blocking the transmission of signals between the column conductor and the common terminal). Thus the clamping switch clamps the potential of the column conductor in this second state of the bridge so that, for example, this potential which applies to all the device elements of that column is not subject to variations which might otherwise occur due to signal currents from the device element of the addressed row in that column and/or leakage currents from the other device elements of non-addressed rows in that column. Such variations of potential could change the bias conditions of the device elements in that column and so could result in false signals on these device elements in the operation of the device.

A variety of clamping arrangements may be used. When, for example, the device elements of the array comprise thin-film transistors, the clamping switch may comprise one or more thin-film transistors. Thus, for example, the clamping switch may be an insulated-gate thin-film transistor which has its source and drain electrodes coupled between the respective column conductor and a reference voltage source. This transistor may be switched on and off, by a control signal applied to its insulated gate.

A clamp line may extend across the columns of the device, and the clamping switch may be coupled between its respective column conductor and the clamp line which is at a reference voltage. The clamping switch may be coupled to the column conductor at a location remote from the diode bridge. However in order to simplify the control circuitry and the device circuit layout, it is advantageous to incorporate the clamping function into the multiplexer circuit. Thus, the clamping switch may form an integrated part of the column multiplexer. In order to reduce the number of conductor lines, the operation of the clamping switch may be controlled by coupling it (either directly or indirectly) to at least one of the respective control lines of the diode bridge. It is convenient to form the clamping switch using the same technology type as the circuit elements of the column multiplexer and/or of the device array. The column multiplexer includes switching diodes in its bridge arrangement. Thus, in a particularly advantageous and convenient form in accordance with the present invention, the column multiplexer circuit for each column conductor may also comprise a pair of clamping diodes coupled between the control lines with an opposite polarity to the polarity of the bridge diodes, the clamping diodes being coupled together at a node with the column conductor for clamping the potential of the column conductor when the bridge is in its second state.

The currents flowing in the respective column conductors produced by the charge storage elements comprise storage element recharging currents. When the charge storage elements comprise photosensitive diodes, the recharging currents may be comparatively high, since they represent the recharging current of a discharged capacitor. The form of row pulse applied to the array of device elements, according to the second aspect of the invention, enables the maximum current flowing in the column conductors to be kept to a minimum, so reducing the currents that must flow through the diode bridge which must be supplied by the current sources. The row pulse may be positive or negative, depending upon the form of pixels used.

It is highly preferred for the diode bridges and clamping switches (of the first aspect of the invention) of the column multiplexer circuits for different groups of the column conductors to share common control lines, so as to reduce the number of such control lines in the device.

In order to reduce the technology types used in the manufacture of the electronic device, it is advantageous when the device elements of the array comprise diodes of the same technology type as the diodes of the column multiplexer circuits. For the same reason, the current sources of the column multiplexer circuits are preferably fabricated with the same type of technology. In one convenient form, the current sources of the column multiplexer circuits comprise photosensitive diodes of the same technology type as non-photosensitive diodes which form the diodes in the first and second arms of the bridge. Although photosensitive diodes are used for these current sources, it should be noted that no optical switching is required. These photosensitive diodes of the current sources may be illuminated constantly during the operation of the device. The row pulse which is generated according to the second aspect of the invention reduces to a minimum the current which must be produced by such illuminated photodiodes, thereby reducing the necessary size of the photodiodes.

The present invention is well-suited to large-area electronic devices in which the device elements of the array and the diodes of the column multiplexer circuits are in the form of thin-film diodes on a common substrate.

The invention also provides a method of operating a device according to the second aspect of the invention comprising supplying a row select pulse to a row of device elements, thereby enabling a signal to be transmitted from the device elements of that row to the respective column conductors, and operating the column multiplexer circuits to transmit selected column signals to the respective common terminals, in which the row select pulse comprises a voltage waveform which rises from a first voltage immediately following the beginning of the select pulse to a second voltage immediately preceding the end of the select pulse.

Of course, an electronic device may include features which combine both aspects of the invention.

BRIEF DESCRIPTION OF THE DRAWINGS

These and other features of the present invention, and their advantages, are illustrated specifically in embodiments of the invention now to be described, by way of example, with reference to the accompanying diagrammatic drawings, in which.

DESCRIPTION OF THE PREFERRED EMBODIMENTS

It should be noted that all the drawings are diagrammatic and not drawn to scale. Relative dimensions and proportions of parts of the cross-sectional view of FIG. 4 have been shown exaggerated or reduced in size for the sake of clarity and convenience in the drawing. In the circuit elements of FIGS. 1 to 3, photosensitive diodes are shown in outline, whereas non-photosensitive diodes are shown with solid black in-fill. The same reference signs are generally used to refer to corresponding or similar features in different embodiments.

Figure 1:
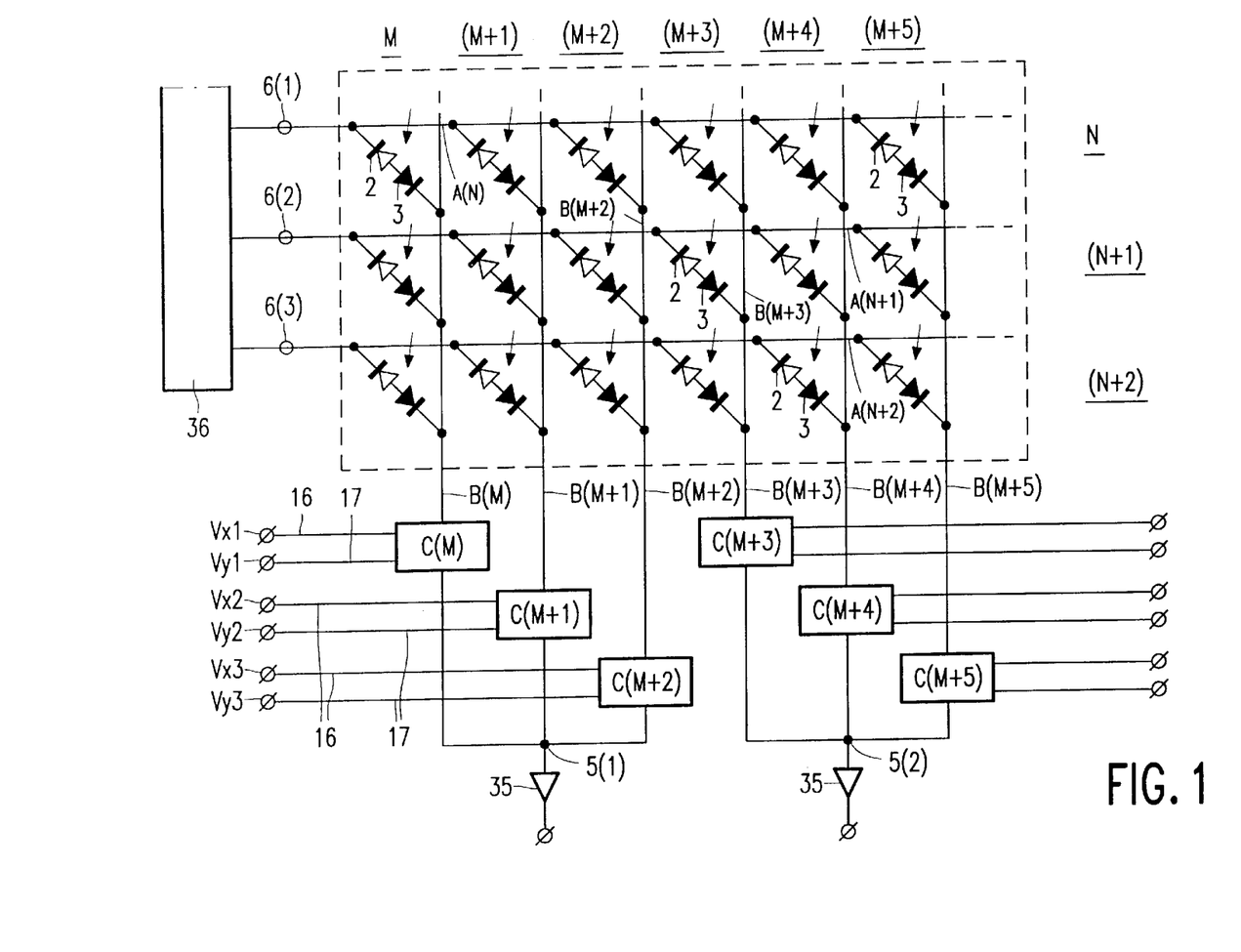
FIG. 1 is a simple circuit diagram of part of an image sensor device in accordance with the present invention and having column multiplexer circuits.
Figure 2:
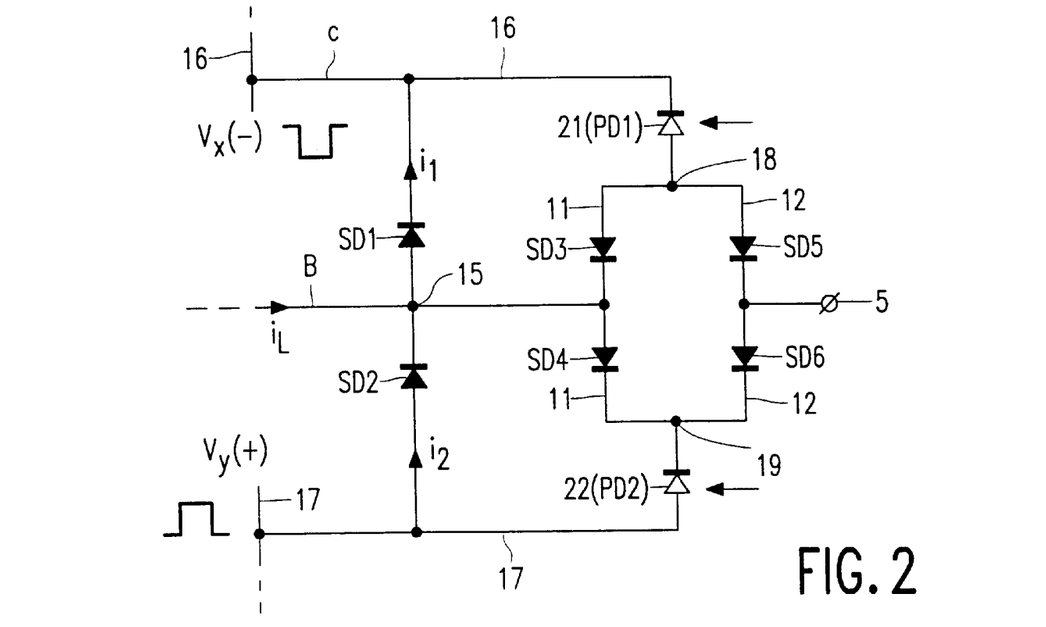
FIG. 2 is a circuit diagram of one such multiplexer circuit of the device of FIG. 1, and illustrating current flow in a second state of the circuit.

The electronic device of FIGS. 1 and 2 comprises an array 1 of device elements 2 and 3 which are arranged in rows N, (N+1), ... and columns M, (M+1) ... and which are coupled to row and column conductors A and B respectively. The column conductors B are arranged in groups, such as group B(M), B(M+1), B(M+2) and the group B(M+3), B(M+4), B(M+5). Each such group has a respective common terminal 5. A column multiplexer circuit C(M), C(M+1) ... couples the column conductors B of a respective group to the respective common terminal 5(1), 5(2), ... These column multiplexers C are simply depicted by a circuit block in FIG. 1 and the circuit construction of each such circuit block in accordance with the present invention is depicted in FIG. 2.

As illustrated in FIG. 2 the column multiplexer circuit C for each column conductor B comprises a respective diode bridge SD3 to SD6 having first and second arms 11 and 12 respectively between two current sources 21 and 22. The arm 11 comprises a pair of switching diodes SD3 and SD4 coupled together at a node 13 of that arm. The arm 12 comprises a pair of switching diodes SD5 and SD6 coupled together at a node 14. All the diodes SD3 to SD6 have the same polarity as each other between the current sources 21 and 22. The respective column conductor B of that multiplexer circuit is coupled to the node 13 of the first arm 11, and the common terminal 5 is coupled to the node 14 of the second arm 12. Control lines 16 and 17 are coupled to the diode bridge SD3 to SD6 via the current sources 21 and 22 for applying switching voltages to switch the diodes SD3 to SD6 between forward bias in a first state of the bridge and reverse bias in a second state of the bridge. In this way, a signal is transmitted between the column conductor B and the common terminal 5 in the first state of the diode bridge and is not transmitted in the second state of the diode bridge.

Figure 6A:
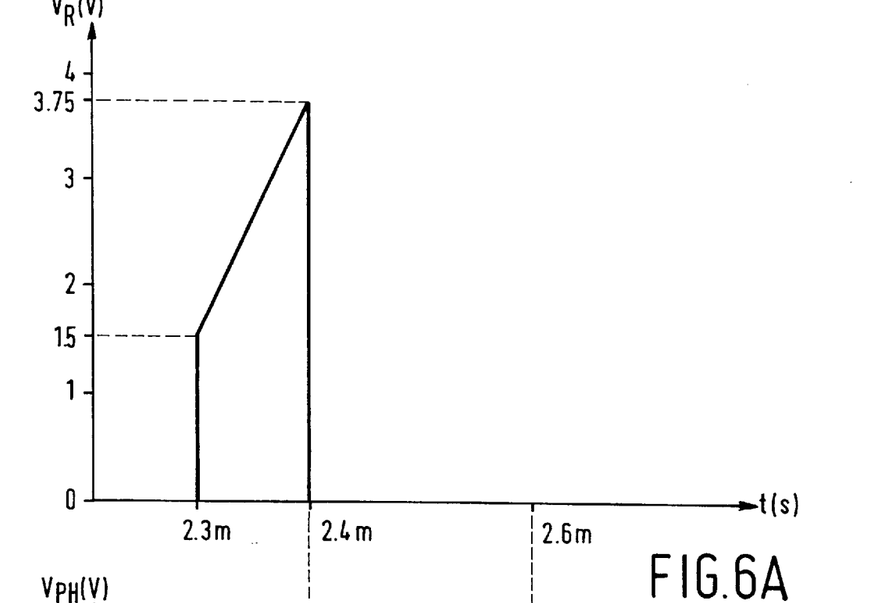
Figure 6B:
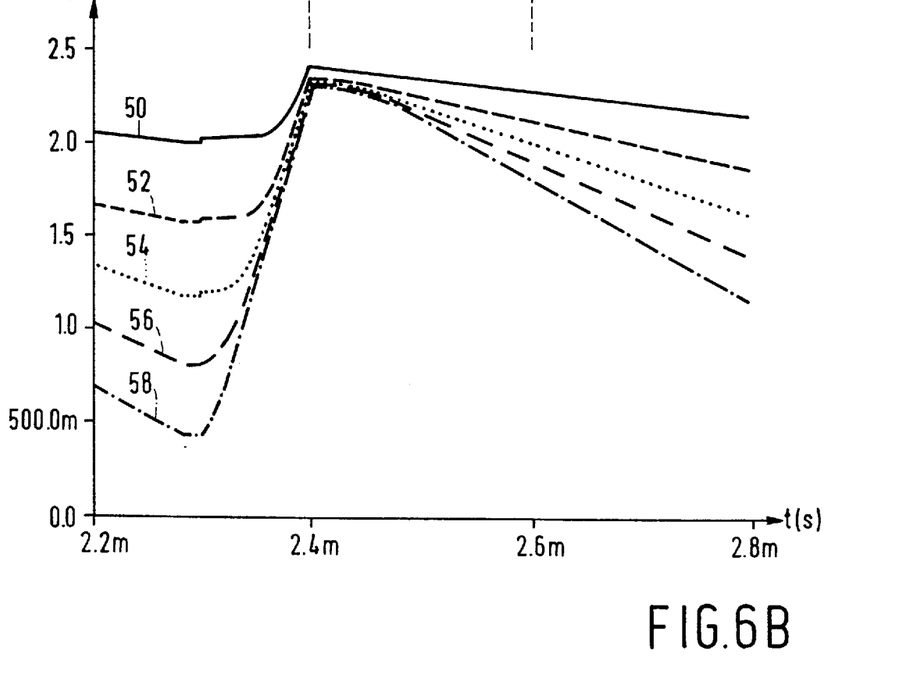
Figure 7:
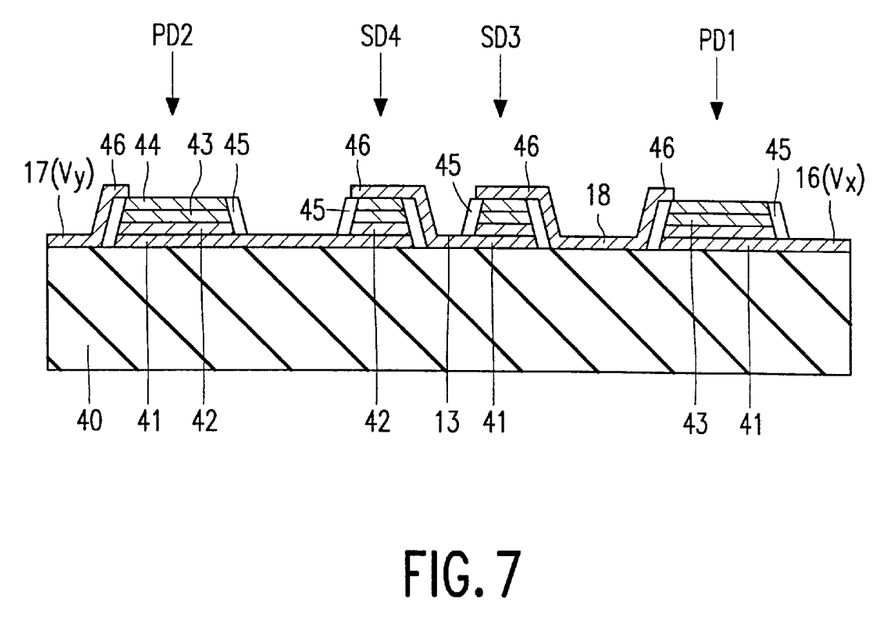
FIG. 7 is a cross-sectional view through part of one example of the multiplexer circuit, fabricated in thin-film technology.

FIGS. 6 and 7 show row pulse waveforms to be applied to the row conductor 6 in order to address the elements of a row, and which enable the peak current flowing through the column conductors B to be reduced with the result that the current which must be supplied by the current sources 21 and 22 can be reduced.

Figure 4A:
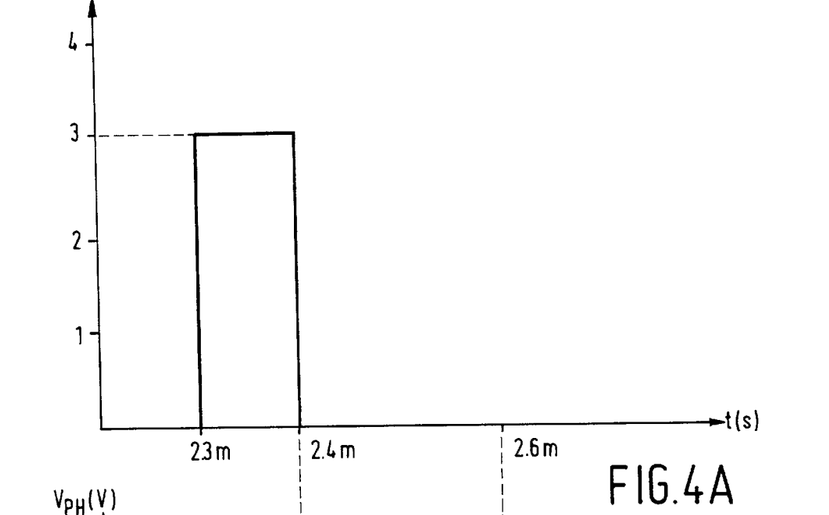
FIGS. 4(a), 4(b), 5(a), 5(b), 6(a), and 6(b) show charging characteristics for image sensor device elements in the form of photodiodes, in response to various row select signals.
Figure 4B:
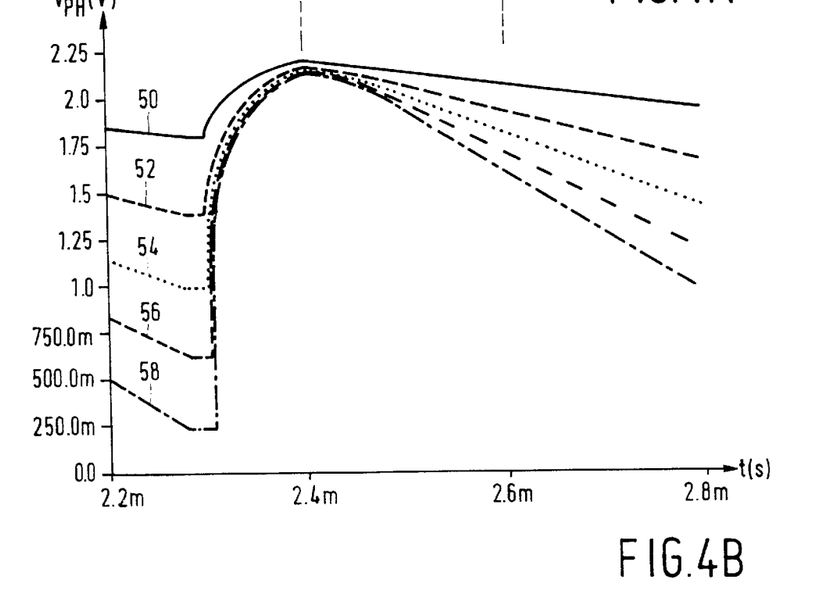

By way of example, FIG. 1 illustrates an array embodiment in the form of an image sensor. Each pixel of the array may be constructed in known manner. FIG. 1 illustrates pixels comprising a photo-sensitive diode 2 in series with a non-photosensitive switching diode 3, similar to the image sensor described in EP-A-0 633 542. These diodes 2 and 3 may be n-i-p thin-film diodes on a device substrate 40 (FIG. 4). As illustrated in FIG. 1, their anodes are coupled together within the pixel, and their cathodes are coupled to the row and column conductors N and M. The device comprises a row driver circuit 36 of known form by which line-scan pulses are applied sequentially to the row conductors A(N), A(N+1), ... to sequentially address the rows N, (N+1) ... of the array. These line-scan pulses serve for forward-biasing the switching diodes 3 of the addressed row. The invention is also concerned with the form of the line scan pulses, as will be described in the following.

The photo-generated signal from those photosensitive diodes 2 whose switching diodes are forward biased is read out on their column conductor B via their respective column multiplexer circuit C. A charge-sensitive amplifier 35 is connected to the common terminal 5 to read this photo-generated signal in known manner.

The charge-sensitive amplifiers 35 may be formed as monolithic silicon integrated circuits, separate from the device substrate 40 on which the array I and column multiplexer circuits C may be formed by thin-film circuitry. Thus, the common terminals 5 may be output terminals of the device substrate 40. Similarly, the row driver 36 may be formed in monolithic silicon integrated circuit technology (separate from the device substrate 40), and so the connections 6 between the row driver 36 and the row conductors A may also be output terminals of the device substrate 40. However, it is also possible to form at least part of the row driver circuit 36 and/or charge-sensitive amplifiers in thin-film circuitry. Thus, these circuit parts may be formed on the same device substrate 40 as the array 1, in which case the terminals 5 and 6 would be internal circuit nodes of the thin-film circuitry on the device substrate 40.

As illustrated in FIG. 1, the column multiplexer circuits C(M) and C(M+3), etc . . . for the different groups of the column conductors B share common control lines 16 and 17 (Vx1, Vy1, Vx2, Vy2 . . .) so as to reduce the number of such control lines in the layout of the device substrate 40. These separate control lines 16 and 17 may extend to output terminals on the device substrate, or they may be connected to a control circuit formed in thin-film circuitry on the same device substrate 40. The control circuit (either integrated on the device substrate 40 or formed as an external monolithic integrated circuit) generates sequences of voltage pulses Vx and Vy for switching the column multiplexer circuits sequentially within each group.

In FIG. 1 only three rows and six columns are shown. An image sensor in accordance with the present invention may typically have several hundred or thousand rows and columns. FIG. 1 shows the column conductors B arranged in groups of three. However, an image sensor in accordance with the present invention may have more than three column conductors B grouped together and coupled by their multiplexer circuits C to a common terminal 5. Because the columns of a group are read out sequentially to the common terminal 5, the read-out speed for the array decreases with the number of columns in each group. Thus, for an image sensor array with a given number of columns, the number of groups is chosen in accordance with the desired read-out speed. Then:

$$\text{no. of column outputs } 5 = \frac{\text{no. of columns}}{\text{no. of groups}} \quad (1)$$

$$\text{no. of control lines 16 and 17 } = \text{no. of groups} \times 2 \quad (2)$$

Thus, in the case of an array having 300 columns arranged in ten groups, there will be thirty column outputs 5 and twenty control lines 16 and 17.

FIG. 2 illustrates the circuit construction of each column multiplexer C. The circuit components of the multiplexer are chosen to be of the same technology type as the device elements of the array 1. Thus, in this example, thin-film diodes are used for both the multiplexer circuit C and for the array 1. All these diodes may be fabricated simultaneously on the device substrate 40 using the same processing steps.

In the circuit of FIG. 2 the current sources 21 and 22 are formed by photodiodes PD1 and PD2. The area of these photodiodes PD1 and PD2 is very much larger than the area of the switching diodes SD1 to SD6. Thus, depending on the intensity level at which they are illuminated, the area of the photodiodes PD1 and PD2 may be of the order of 10 to 100 times the area of the photodiodes 2 of the array 1. However, as will be described in the following, it is possible to reduce the size of the photodiodes by using an appropriate row signal waveform. The photodiodes PD1 and PD2 are constantly illuminated and this avoids the need for any optical switching. The illuminating light source is arranged to give a constant light intensity on the photodiodes PD1 and PD2.

The column multiplexer circuit also comprises a clamping switch SD1,SD2 coupled to the respective column conductor B for clamping the potential of the column conductor B in the second (non-transmitting) state of the diode bridge SD3 to SD6. In the particular example illustrated in FIGS. 2 and 3, this clamping switch comprises a pair of clamping diodes SD1 and SD2 coupled between the control lines 16 and 17 with an opposite polarity to the polarity of the bridge diodes SD3 to SD6. These clamping diodes SD1 and SD2 are coupled together at a node 15 with the column conductor 5, for clamping the potential of the column conductor when the bridge is in the second state (i.e when the bridge diodes SD3 to SD6 are reverse-biased and blocking transmission of the signal).

The column multiplexer C is switched between its first and second states by the voltage pulses Vx and Vy applied on the control lines 16 and 17. For simplicity of operation, it will be assumed that the pulses Vx and Vy switch between negative and positive levels of the same magnitude and that the two diodes in each pair (SD1,SD2), (SD3,SD4), and (SD5,SD6) have the same conduction characteristics so that the column conductor B will be at zero potential in both the first and second states of the circuit. The operation is as follows, (considering multiplexer circuit C (M)):
First state of the circuit:
Vx=positive (e.g. +5V) Vy=negative (e.g. -5V)

These correspond to the voltage levels to which the control lines 16 and 17 of multiplexer C(M) are switched when it is desired to read out the signal on column conductor B(M).

With this polarity of the voltage levels Vx and Vy, the switching diodes SD1 and SD2 of the clamp are reverse-biased in an OFF state, and the switching diodes SD2–SD6 of the bridge are forward-biased in an ON state. In this state of the multiplexer C, the constantly-illuminated photodiodes PD1 and PD2 supply constant currents to the diode bridge SD3 to SD6, and the addressed row pixel in this particular column is now read out.

Figure 3:
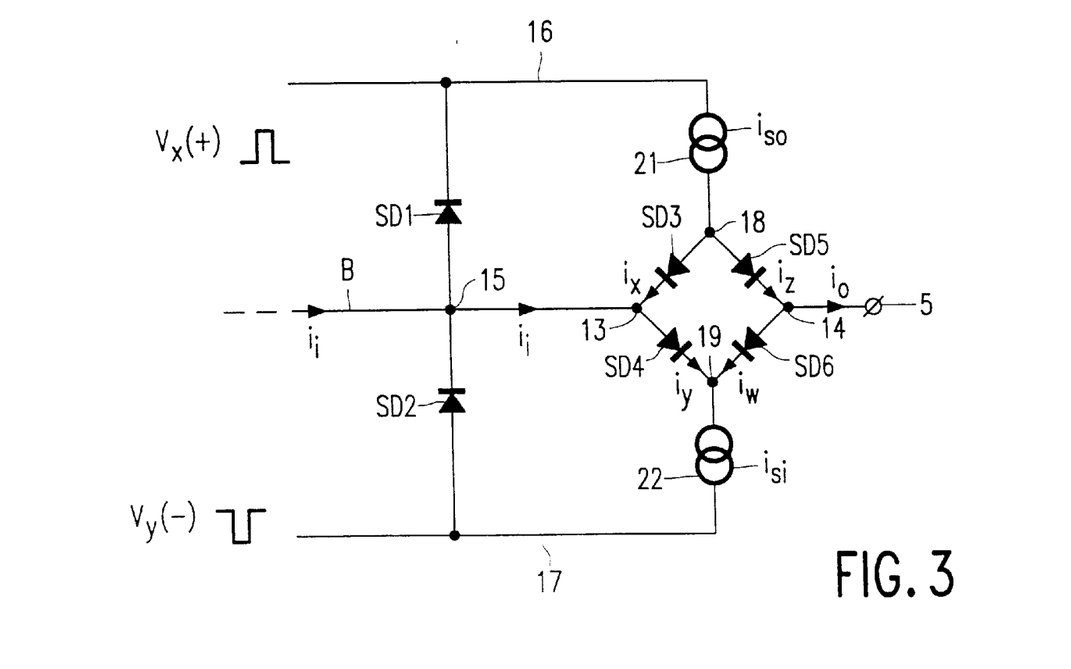
FIG. 3 is a circuit diagram illustrating current flow in a first state of the multiplexer circuit of FIG. 2.

Thus, any current $i_i$ which flows on the column conductor B will then flow as an output current $i_o$ out of the diode switch SD3 to SD6 and to the column amplifier 35. This is now explained with reference to FIG. 3, in which:

$i_{so}$ is the current generated by PD1

$i_{si}$ is the current sunk by PD2

$i_x$ is the bridge current flowing between nodes 18 and 13

$i_y$ is the bridge current flowing between nodes 13 and 19

$i_z$ is the bridge current flowing between nodes 18 and 14

$i_w$ is the bridge current flowing between nodes 14 and 19

At node 18: $i_{so}=i_x+i_z$     (3)

At node 19: $i_{si}=i_y+i_w$     (4)

At node 13: $i_y=i_x+i_i$     (5)

At node 14: $i_z-i_w=i_o$     (6)

Taking equation (7) and substituting for $i_z$ and $i_w$ gives:

$$i_{so}-i_x-i_{si}+i_y=i_o$$

but $(i_y-i_x)=i_i$, and so $$i_{so}+i_i-i_{si}=i_o$$

Assuming that the current outputs of diodes PD1 and PD2 are the same, then:

$i_{so}=i_{si}$, and so:

$$i_i=i_o \quad (7)$$

i.e the output current from node 14 of the bridge SD3 to SD6 equals the input current at node 13. This result is independent of the respective switching characteristics of the diodes SD3 to SD6 of the diode bridge. There is therefore no need for the diodes to be accurately matched.

Second state of the circuit:
Vx=negative (e.g. −5V) Vy=positive (e.g. +5V)

With this polarity of the voltage levels Vx and Vy, the switching diodes SD3 to SD6 of the bridge are reverse-biased in an OFF state, and the switching diodes SD1 and SD2 of the clamp are forward-biased in an ON state. When the multiplexer C(M) is in this state, a different multiplexer, C(M+1) for example, will have been switched to the previously described first state, by appropriate control of other control signals, for example Vx2 and Vy2.

As a result of the photogeneration of current within each photodiode PD1 and PD2 by the constant illumination, each photodiode PD1 and PD2 generates a potential drop of about 300 mV across itself in the reverse bias direction. The bias condition of the diode bridge SD3 to SD6 is dominated by the much higher voltage levels Vx and Vy. In this state of the multiplexer C, the diode bridge SD3 to SD6 does not transmit any signal from its column conductor B to the terminal 5. The output current ($i_o$) of the bridge SD3 to SD6 is zero, and so this particular column is not being read out.

The switching diodes SD1 and SD2 act as a voltage clamp, clamping the column conductor B at a constant potential. This constant potential is zero volts, in the assumed situation when Vx=−Vy and when SD1 and SD2 have the same ON characteristics. The clamping effect can best be understood by considering the device elements 2,3 of the various rows which are coupled to this column conductor B. Thus, for example, the multiplexer C of FIG. 2 may be C(M) of FIG. 1, and the pixels of row N may be addressed by a positive voltage scanning pulse on row conductor 6(1).

In this case, the switching diode 3 of row N, column M is forward biased, and the switching diodes 3 of all the other rows (N+1), (N+2),etc. in column M are reverse biased. Although its switching diode 3 is forward biased, the image signal of pixel N,M is not read out by the charge-sensitive amplifier because the multiplexer C(M) is in a blocking state. Although the switching diodes 3 of the other rows of column M are reverse biased, there is still a small leakage current through these diodes. In the clamping state of the diodes SD1 and SD2, currents $i_L$ (resulting from the image signal of pixel N,M and the leakage currents through the switching diodes 3 of the other rows of column M) which may be present on the column conductor B(M) are drained safely away via the forward-biased diodes SD1 and SD2. Thus, in FIG. 2, at node 15: $i_1=i_2+i_L$     (8)

where $i_1$ and $i_2$ are the currents through the forward-biased clamping diodes SD1 and SD2 respectively. In the absence of these forward-biased clamping diodes SD1 and SD2, these currents $i_L$ could cause the potential of the column conductor B to vary and so could change the bias conditions of the pixels in non-addressed rows (N+1), (N+2),etc. of column M. When these pixels in the non-addressed rows (N+1), (N+2),etc. are later addressed, a false signal (not representative of the image illumination incident on these pixels) may be read out as a result of these changed bias conditions. This undesirable effect is avoided by the provision of a clamping switch SD1,SD2.

The clamping switch therefore provides a sink for the leakage currents and the photodiode current of the pixel in the selected row, because it is supplied by a voltage source (rather than driven by a current source). The voltage source supply enables variations in current through the diodes SD1, SD2 to accommodate the leakage currents. This enables the clamping switch clamps the potential of the column conductor in this second state of the bridge so that the potential which applies to all the device elements of that column is not subject to variations.

Other forms of clamping arrangements may be used, providing they enable the leakage currents to be dissipated so that the column potential may be held at a constant potential. This constant potential preferably corresponds to a potential at which the output is held by a charge sensitive amplifier. When the device elements of the array comprise thin-film transistors, the clamping switch may comprise one or more thin-film transistors. Thus, for example, the clamping switch may be an insulated-gate thin-film transistor which has its source and drain electrodes coupled between the respective column conductor and a reference voltage source. This transistor may be switched on and off, by a control signal applied to its insulated gate.

A clamp line may extend across the columns of the device, and the clamping switch may be coupled between its respective column conductor and the clamp line which is at a reference voltage. The clamping switch is shown as integrated with the column multiplexer, but it may be coupled to the column conductor at a location remote from the diode bridge. In the example shown, the operation of the clamping switch is controlled by coupling it to the control lines of the respective diode bridge, but of course, the clamping switch may have independent control.

Equation (7) above, relating to the ON condition of the diode bridge multiplexer circuit, is only satisfied when the photodiode currents $i_{so}$ and $i_{si}$ are greater than the input current $i_i$ and output current $i_o$. This is because all currents flowing in the diode bridge must have positive values, since the currents can flow in one direction only. Combining (3) and (6):

$$i_{so}=i_o+i_w+i_x \text{ hence } i_{so}>i_o \quad (9)$$

combining (4) and (5):

$$i_{si}=i_i+i_w+i_x \text{ hence } i_{si}>i_i \quad (10)$$

The input current $i_i$ is the charging current which recharges the pixel photodiode self-capacitance. This charging current varies during the recharging operation, and also depends upon the level of illumination of the pixel photodiode during the integration period. As a consequence of equations (9) and (10), the photodiodes PD1 and PD2 must produce a current which is sufficient to at least equal the maximum capacitor charging current, and this imposes minimum dimensions for the photodiodes PDI and PD2. The present invention provides a method of operating the multiplexer circuits so as to reduce the peak current flow which must be switched by the diode bridge network.

If the pixel arrangement shown in FIG. 1 is adapted for use as an image sensor with a resolution of approximately 125 dpi, then the pitch between pixels is approximately 200 μm. This represents a relatively low resolution for an image sensor, and thus represents relatively large pixel photodiodes. As a result, the photodiode capacitance is relatively high, therefore resulting in large recharging currents. The following analysis is therefore based on assumptions which give rise to large recharging currents, representing a worst-case estimate. A 200 μm pixel pitch may allow the photodiode of each pixel to occupy an area of 140 μm×140 μm. A typical thin film photodiode construction of this dimension will have a capacitance of approximately 4 pF.

During the integration period of the pixels, when each pixel is isolated from the respective column conductor, the light incident on the photodiode has the effect of discharging the photodiode self-capacitance. When the row conductor is driven so as to select a respective row of pixels, the row conductor provides a current to recharge the photodiode self-capacitance, and this recharging current flows through the respective switching diode and into the column conductor B for measurement. It is the maximum value of this capacitor recharging current which determines the minimum currents that must be produced by the photodiodes PD1 and PD2 of the multiplexer circuits.

FIG. 4 shows the recharging characteristics for the photodiode capacitance using a conventional rectangular row waveform. The row waveform is applied to the rows by a row driver, such as element 36 (shown in FIG. 1). As shown, the row waveform is pulsed high at 2.3 ms (for the purposes of the simulation) and remains high for a duration of 0.1 ms. The row voltage waveform VR is represented in part A of FIG. 4, and the peak voltage is 3 volts.

During the row voltage waveform, the photodiode capacitance will recharge and the recharging current is measured by the charge sensitive amplifier 35. FIG. 4 part B shows the voltage across the photodiode VPH for the situation where different light intensities have illuminated the photodiode between row pulses. The curve referenced 58 represents a maximum illumination of the pixel and consequently the photodiode capacitance is almost completely discharged at the end of the integration period (between row pulses). Curve 50 represents a low level of illumination of the photodiode and the curves 52–56 represent increasing levels of illumination. When the row pulse is high, the photodiode capacitance is recharged so that the voltage across the photodiode increases. The photodiode voltage reaches a maximum which corresponds substantially to the voltage level of the row pulse less the forward bias voltage drop across the switching diode 3 (assuming that respective column conductor is held at 0 volts during readout).

After the termination of the row pulse, the voltage across the photodiode drops in dependence upon the level of illumination. It should be noted that the rate at which the voltage is shown to drop in FIG. 4 is exaggerated for the purposes of illustration since the time between row pulses is significantly greater than the duration of the row pulse. For example, in the case of an A4 image scanner, if a resolution of 125 dpi is achieved, this represents approximately 1,000 rows so that each row pulse lasts 0.1 ms and is repeated every 100 ms.

The curves shown in FIG. 4 part B enable the maximum photodiode recharging current to be estimated. In the case of FIG. 4, the maximum illumination curve 58 has a steep response following the rising edge of the row pulse, and the recharging current can be calculated from the equation Given an approximate photodiode capacitance of 4 pF, the curve 58 of FIG. 4, representing maximum illumination, has a slope dv/dt which $$I = C\frac{dv}{dt}$$

corresponds to a current of ipA.

Consequently, the use of the rectangular row waveform shown in FIG. 4 requires the multiplexer photodiodes to produce a current of at least 1 μA.

An amorphous silicon diode with an intrinsic layer depth of 5000 angstroms produces a current of $0.68\times10^{-15}$ A/μm²/Lux (for light of 580 nm wavelength).

Given a typical illumination of 100 Lux, to produce the required current of 1 μA, the light receptive area of the photodiode needs to be $14.7\times10^6$ (μm)².

However, since the photodiodes PD1 and PD2 are to be integrated onto the substrate, the pixel pitch defines the maximum separation of the photodiodes, although the photodiodes may be arranged alternately at opposite edges of the substrate. Thus, the maximum separation of the photodiodes for a 200 μm pixel pitch is 400 μm. To obtain the required area of photodiode to produce the 1 μA current, this maximum separation corresponds to a photodiode length of 37 mm.

If conventional row addressing is adopted, as shown in FIG. 4, the multiplexer photodiodes must occupy a significant area around the substrate. The invention provides a novel row addressing technique which enables the multiplexer circuit to be implemented without this increased peripheral area.

Figure 5A:
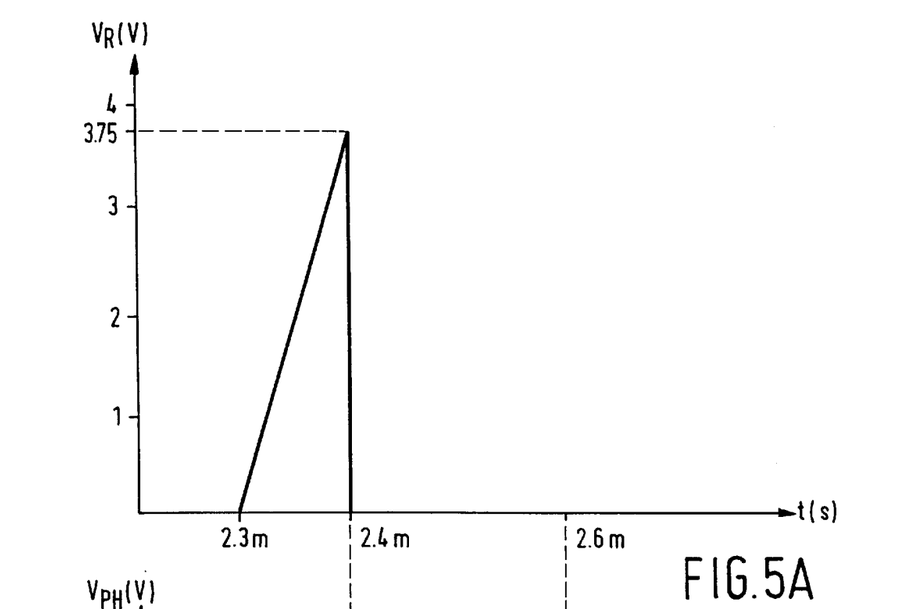
Figure 5B:
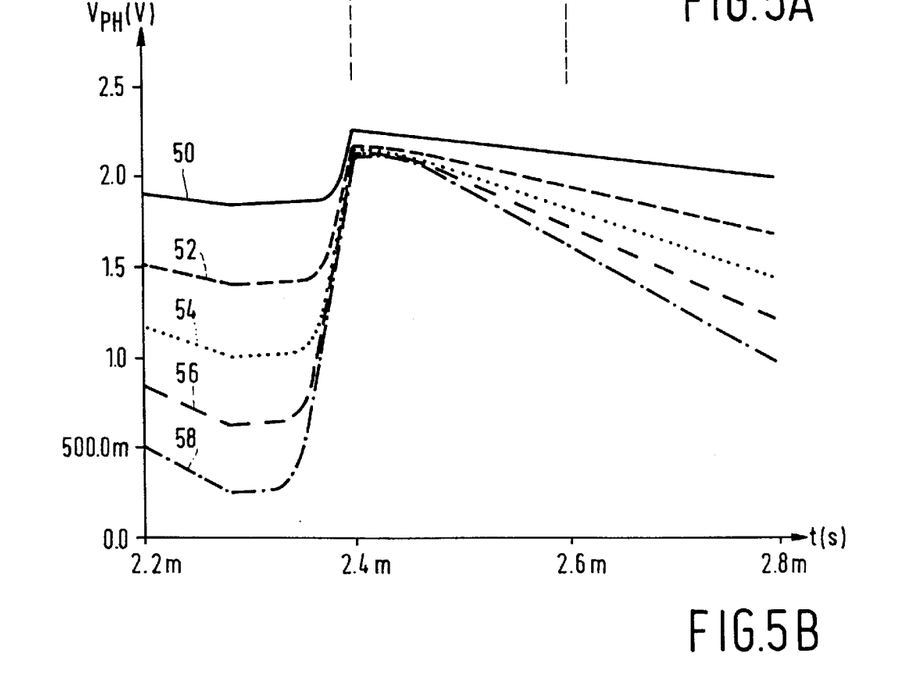

FIG. 5 and 6 show two possible row voltage waveforms according to the invention together with respective analysis of the photodiode recharging current using the same model as that used in FIG. 4. As seen, these row waveforms are in the form of a base voltage (when the row is not addressed) and a row pulse (when the row is addressed) which rises in magnitude, relatively to the base voltage, from a first voltage magnitude immediately following the beginning of the row pulse to a second voltage magnitude immediately preceding the end of the row pulse. The same reference numerals have been used to represent the charging and discharging characteristics for the various levels of photodiode illumination.

The row waveform shown in FIG. 5 part A has a sawtooth form reaching a peak of 3.75 volts. As can be seen in FIG. 5 part B, this increased final voltage level of the row waveform results in the voltage across the photodiode reaching a similar maximum level at the end of the row waveform. For the pulse in FIG. 5, the first voltage magnitude is 0V, the second voltage magnitude is 3.75 V, and the voltage increases substantially linearly. The gradual increase of the row pulse eliminates the sharp rise in the photodiode voltage which occurred at the beginning of the row pulse in the situation shown in FIG. 4. In the case of FIG. 5, the increase in the photodiode voltage gives rise to a maximum recharging current of approximately 150 nA. As a result, the corresponding length of the photodiodes PD1 and PD2 of the multiplexer circuit may be reduced to 5.5 mm. The performance of a pixel in terms of linearity and lag is only marginally affected by the ramped row select pulse, and this marginal degradation in performance can be recovered, if required, by increasing the length of the row select pulse by around 10–20%.

FIG. 6 shows the analysis for an alternative row select pulse, in which the row waveform has a stepped component and a ramped (saw tooth) component. For the pulse in FIG. 6, the first voltage magnitude is 1.5V, the second voltage magnitude is 3.75 V, and the voltage increases substantially linearly. By altering the value of the initial voltage step and the slope of the ramped portion of the row waveform, a charging characteristic can be obtained for which the maximum charging current is at its lowest. Clearly, the lowest peak charging current will be obtained when the maximum illumination curve 58 rises uniformly to the charged level during the row select period. The row waveform shown in FIG. 6 part A, achieves approximately this charging characteristic for the charging curve 58. The slope of this curve corresponds to a peak current of approximately 90 nA, and the corresponding required length of the multiplexer photodiode PD1 and PD2 is then 3.3 mm.

The invention therefore provides a method of addressing the rows of the array of elements so as to facilitate a practical implementation of the column multiplexer circuit according to the invention. Although positive row pulses have been shown, alternative pixel configurations may be employed for which rows of pixels may be addressed by negative row pulses. Furthermore, the row signal according to the second aspect of the invention is not limited to the forms shown in FIGS. 5 and 6, and the increase in the row pulse magnitude may not be uniform as shown in the Figures. Instead, the pulse may have a non linear increase in magnitude, and may include a rising portion and a level portion. The row voltage waveform should be designed to reduce to a minimum the peak current flowing for the particular charge storage element pixel configuration.

FIG. 7 illustrates one specific example of a multiplexer circuit C in accordance with the invention and fabricated in thin-film technology. This thin-film technology may be the same as that used to fabricate the array 1, and so it may be similar to that described in EP-A-0 633 542. As illustrated in FIG. 4, the thin-film circuitry is formed on a substrate 40. This substrate 40 may be formed of any suitable glass or plastics material. A first electrically conductive layer 41 (for example of chromium) is deposited onto the substrate 40 and patterned by etching to define the cathode electrodes of the diodes PD1, PD2, SD1, SD2, SD3, SD4, etc . . . This conductor pattern 41 may also form conductor tracks, for example for the lines 16 and 17, and also circuit nodes such as 13,14,15,18 and 19. The various diode structures are then formed by depositing and patterning appropriately-doped semiconductor layers.

In this specific example, all the diodes may be amorphous silicon n-i-p diodes formed by depositing in sequence n-type conductivity, intrinsic and p-type conductivity amorphous silicon layers 42 to 44. These layers 42 to 44 are patterned by etching to form a separate island for each diode. An insulating layer (for example silicon nitride) is then deposited and patterned so as to be left on the side-walls of the diode islands. This insulating layer pattern 45 leaves exposed at least of the top surface of the diode islands. A second conductive layer 46 (for example chromium, possibly covered with aluminium) is then deposited and patterned to form the anode electrodes of the diodes and interconnections between the two conductive layer levels as desired. This top conductive layer 46 may be opaque to the illuminating light, in which case (as shown in FIG. 4) the layer 46 may be restricted to the edge of the top p-type layer 44 of the photosensitive diodes PD1, PD2. The layer 46 extends, however, over the whole of the top of the switching diodes SD1 to SD6, so that these diodes are not photosensitive. The photosensitive diodes 2 of the array pixels may be formed in the same manner as the photosensitive diodes PD1 and PD2, and the switching diodes 3 may be formed in the same way as the switching diodes SD1 to SD6. Thus the array 1 and their column multiplexers C can be formed with the same process steps on the same device substrate 40 using the same thin-film diode technology.

The layout of the image sensor may have any appropriate configuration and pattern. The photodiodes PD1 and PD2 which act as the current sources of the multiplexer circuits C are located in an area of the device substrate 40 where they can be constantly exposed (during operation of the sensor device) to illumination of constant intensity. The switching diodes SD1 to SD6 are however shielded from this constant illumination by opaque electrode layers 41 and 46 and/or by an optical mask. The image array 1 is located in the area of the device substrate 40 where an image is to be sensed by the photodiodes 2. The row and column conductors A and B may define rectangular or square areas for the pixels, or any other desired geometry. The photodiodes 2 may occupy most of the pixel area. However, the photodiodes 2 may be confined to one or more edges of their respective pixel so as to allow the image sensor to be as transparent as possible. Such a transparent image sensor may then be placed on top of something else, such as a display, without significantly obscuring the display.

FIG. 7 illustrates an arrangement in which the light is incident at the top surface of the device and is transmitted to the semiconductor material of the photodiodes via windows in the top electrode layer 46. However an inverted arrangement may be constructed in which the windows are present in the bottom electrode layer 41, and the incident light (for PD1 and PD2) and image (for array photodiodes 2) is transmitted via a transparent substrate 40.

FIGS. 2 and 3 show single diodes SD3 to SD6 in each arm of the bridge, single diodes SD1 and SD2 between the column conductor and the respective control line 16, 17, and single diodes PD1 and PD2 forming the current sources 21 and 22. However two diodes or more in series may be used instead of these single diodes. Thus, for example, there may be two series diodes SD1 between the node 15 and line 16, and two series diodes SD2 between the node 15 and line 17. Furthermore some imbalance may be present in the conduction characteristics of the diodes, and the diode and biasing arrangement may be such that the column conductor is operated at a potential which is not zero volts.

The device elements of the array 1 may comprise thin-film transistors. Thus, for example, each pixel may comprise a known circuit configuration of two switching transistors and a photoconductor. In this case, the diodes PD1, PD2, and SD1 to SD6 of the column multiplexer C may be formed as diodeconnected thin-film transistors, i.e. the gate and drain of the transistor may be coupled together as one electrode of the circuit element. Furthermore when transistors are used, the clamping switch may be a single transistor having its source coupled to the conductor B, its drain coupled to a clamping voltage line, and its gate coupled to a control line for switching the transistor ON and OFF in opposite synchronisation with the diode bridge SD3 to SD6.

An image sensor in accordance with the present invention may be designed as a document scanner. A very large area image sensor may be formed capable of scanning an A4 size page at a resolution of 300 dpi (dots per inch). The number of rows N, (N+1), . . . and column M, (M+1), . . . required for such an image sensor is about 2500 and 3500 respectively (with the rows parallel to the long side of the A4 page). The present invention permits the number of column outputs 5 to be reduced by grouping the column conductors B with column multiplexer circuits C in accordance with the present invention. A similar multiplexer circuit may be used on each row conductor A to reduce the number of inputs 6 from the row driver circuit 36. The multiplexer circuits C may be combined with other additional measures to reduce the number of row and column conductors A and B and input and output terminals 6 and 5. Thus, the array configuration may be similar to that disclosed in pending United Kingdom patent application GB 9505305.4 (our reference PHB 33976), in which the pixels are arranged in groups of four which share a common row conductor A and a common column conductor B.

Although specific embodiments of the present invention have been illustrated as image sensors, the present invention may be used with other array devices, for example liquid-crystal displays or memories and data stores. The display array 1 may comprise n-i-p (or p-i-n) switching diodes, for example as described in U.S. Pat. No. 5,008,590 (our reference PHN 12687), the whole contents of which are incorporated herein as reference material. In this case, the column multiplexer circuits C in accordance with the present invention may be included between the column driver circuit and the column conductors B for switching/transmitting the analogue video signals to the pixels of an addressed row of the array 1. Memory arrays also comprising n-i-p or p-i-p diodes are known, for example as described in U.S. Pat. No. 5,272,370 (our reference PHB 33725), the whole contents of which are incorporated herein as reference material. Using the invention in this case, the column multiplexer circuits C in accordance with the present invention may be included between the read-out circuit and the column conductors B for switching/transmitting the digital data signals from an addressed row of the memory array 1.

The terminology "columns" and "rows" for an array is somewhat arbitrary, and whether the transverse conductors in one direction (A or B) are referred to as "row" conductors or "column" conductors may depend on, for example, whether the array is square or rectangular and on its orientation in use. In the embodiments so far described, the multiplexer circuits C were used on the data lines B of the array 1. However the multiplexer circuits C in accordance with the present invention may be used instead on the scan (or addressing) lines A of an array 1, which were described above as "row" conductors. Thus, "column" multiplexer circuits C in accordance with the present invention may be used instead as "row" multiplexers and so may transmit line-scan pulses from the "row" driver circuit 36 to the "row" conductors A.

Although the specific embodiments so far described are realised with thin-film technology on an insulating substrate 40, the array 1 and multiplexer circuits C of an electronic device in accordance with the present invention may be realised with monolithic silicon integrated circuit technology instead of thin-film circuitry.

From reading the present disclosure, other variations and modifications will be apparent to persons skilled in the art. Such variations and modifications may involve equivalent features and/or other features which are already known in the design, manufacture and use of electronic devices comprising thin-film circuitry, diode circuits and component parts thereof and which may be used instead of or in addition to features already described herein. Although claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The Applicants hereby give notice that new claims may be formulated to such features and/or combinations of such features during the prosecution of the present Application or of any further Application derived therefrom.

We claim:

1. An electronic device comprising:

an array of device elements which are arranged in rows and columns and which are coupled to row and column conductors, the column conductors being arranged in at least one group, each group having a respective common terminal;

a plurality of column multiplexer circuits coupling the column conductors of a respective group to the respective common terminal, a column multiplexer circuit for each column conductor comprising a respective diode bridge having first and second arms between two current sources, each arm comprising a respective pair of diodes coupled together at a respective node of that arm and having the same polarity as each other between the current sources, the respective column conductor being coupled to the node of the first arm, the common terminal being coupled to the node of the second arm, and control lines coupled to the diode bridge for applying switching voltages for switching the diodes between forward bias in a first state of the bridge and reverse bias in a second state of the bridge; and a clamping switch coupled to the respective column conductor for clamping the potential of the column conductor in the second state of the diode bridge, the clamping switch for each respective column conductor forming part of the column multiplexer circuit and comprising a pair of clamping diodes coupled between the control lines with an opposite polarity to the polarity of the bridge diodes, the clamping diodes being coupled together at a node with the column conductor for clamping the potential of the column conductor when the bridge is in the second state, whereby a signal is transmitted between the column conductor and the common terminal in the first state of the diode bridge whereas the potential of the column conductor is clamped in the second state of the diode bridge.

2. An electronic device according to claim 1 wherein the diode bridges and clamping switches for different groups of the column conductors share common control lines.

3. An electronic device according to claim 1 wherein the device elements of the array comprise diodes of substantially the same construction as the diodes of the plurality of column multiplexer circuits.

4. An electronic device according to claim 3, wherein the current sources of the plurality of column multiplexer circuits comprise photosensitive diodes of the same technology type as non-photosensitive diodes which form the diodes in the first and second arms of the bridge.

5. An electronic device according to claim 3, wherein the diodes of the array and of the plurality of column multiplexer circuits are in the form of thin-film diodes on a common substrate.

6. An electronic device according to claim 1 wherein the plurality of column multiplexer circuits transmit analog signals between the column conductors and the common terminal in the first state of the diode bridge.

7. An electronic device according to claim 6, wherein the device elements of the array are photosensitive diodes which together form an image sensor.

8. An electronic device comprising:

an array of charge storage elements which are arranged in rows and columns and which are coupled to row and column conductors, a row signal applied to a row conductor enabling charge storage element signals of elements in the respective row to be supplied to the respective column conductors, the charge storage element signals producing a current flowing in the respective column conductors, the column conductors being arranged in at least one group, each group having a respective common terminal;

a plurality of column multiplexer circuits coupling the column conductors of a respective group to the respective common terminal, in which a column multiplexer circuit for each column conductor comprises a respective diode bridge having first and second arms between two current sources, each arm comprising a respective pair of diodes coupled together at a respective node of that arm and having the same polarity as each other between the current sources, the respective column conductor being coupled to the node of the first arm, the common terminal being coupled to the node of the second arm;

control lines coupled to the diode bridge for applying switching voltages for switching the diodes between forward bias in a first state of the diode bridge and reverse bias in a second state of the diode bridge, whereby one of the charge storage element signals is transmitted between the column conductor and the common terminal in the first state of the diode bridge; and row driver for generating the row signal in the form of a row pulse voltage waveform rising from a base voltage, the magnitude of the row pulse voltage waveform increasing from a first voltage magnitude immediately following the beginning of the pulse to a second voltage magnitude immediately preceding the end of the pulse.

9. An electronic device as claimed in claim 8, wherein the first voltage magnitude is greater than zero.

10. An electronic device as claimed in claim 8, wherein the row signal magnitude rises uniformly from the first voltage magnitude to the second voltage magnitude.

11. An electronic device as claimed in claim 8 wherein the device further comprises a clamping switch coupled to the respective column conductor for clamping the potential of the column conductor in the second state of the diode bridge.

* * * * *